March 3, 1959 A. A. ROOT 2,876,358
METHOD OF AND APPARATUS FOR TREATING SURFACES OF
THERMOPLASTIC CONTAINERS BY CORONA DISCHARGE
Filed April 18, 1957 3 Sheets-Sheet 1

INVENTOR.
ANDREW A. ROOT
BY
ATTORNEYS

INVENTOR.
ANDREW A. ROOT
BY
ATTORNEYS

FIG. 4
FIG. 5
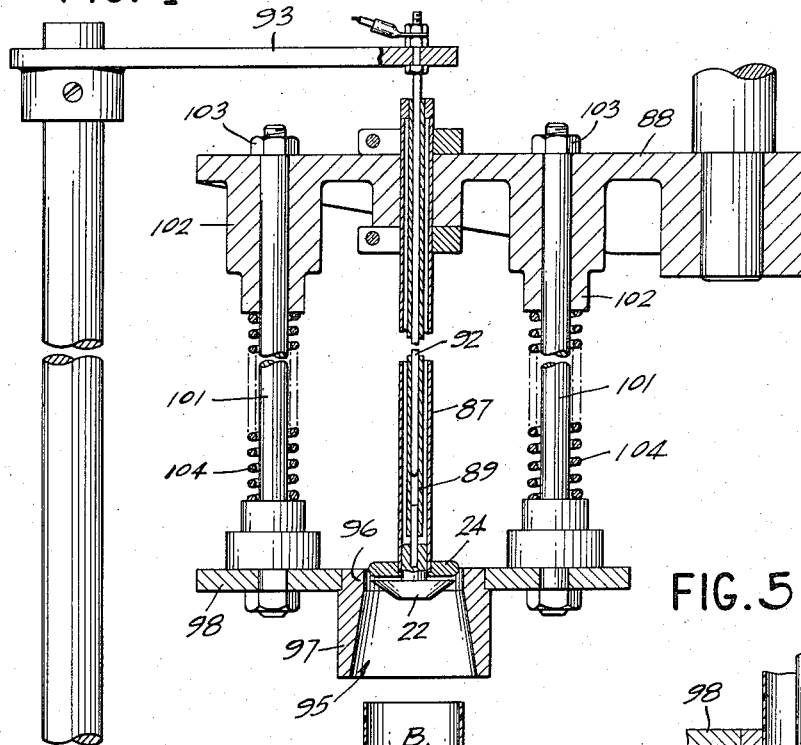
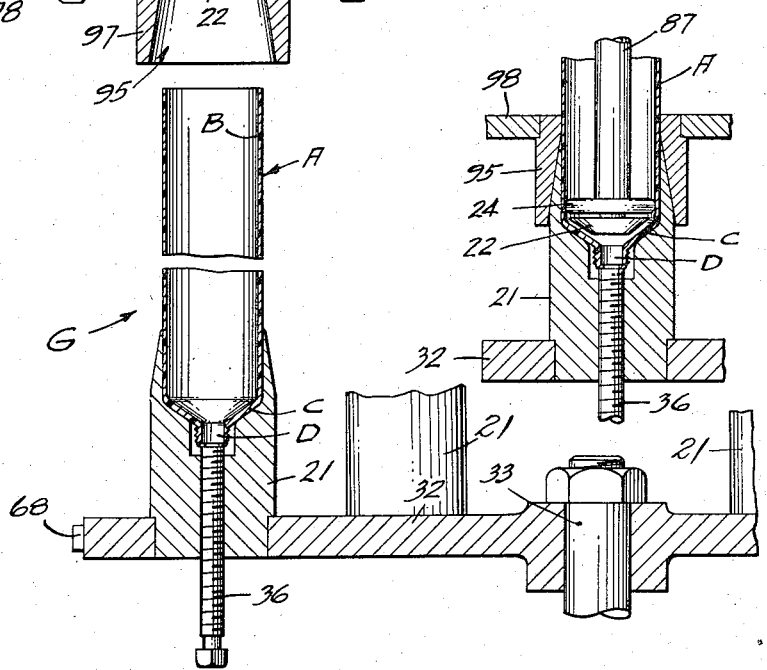
INVENTOR.
ANDREW A. ROOT
BY Charles H. Cline
Leland R. McCann
George W. Reiber
ATTORNEYS United States Patent Office 2,876,358
Patented Mar. 3, 1959

2,876,358

METHOD OF AND APPARATUS FOR TREATING SURFACES OF THERMOPLASTIC CONTAINERS BY CORONA DISCHARGE

Andrew A. Root, Concord, Mass., assignor to Bradley Container Corporation, Maynard, Mass., a corporation of Delaware Application April 18, 1957, Serial No. 653,652

23 Claims. (Cl. 250—49.5)

The present invention relates to the surface treatment of thermoplastic tubing for the reception of protective and decorative coatings, inks, adhesives and the like in a manner which causes them to readily and firmly adhere thereto, and has particular reference to a method of and apparatus for improving the adherence characteristics of surfaces of thermoplastic tubing by enclosing the surfaces to be treated in an air gap between inner and outer electrodes through relative axial movement between the electrodes and subjecting the surfaces to an electrical corona discharge.

An object of the instant invention is to provide a method of and apparatus for especially treating with an electrical corona effect, the interior surfaces of thermoplastic tubular containers having one end closed or with head and a tubular orifice, thereby requiring interior treatment through the opposite open end of the container.

Another object is the provision of such a method and apparatus wherein the head, orifice wall or end member of the container may be treated simultaneously with the sidewalls of the container.

Another object is the provision of such a method and apparatus which permits of omitting treatment of a predetermined portion of the tubular body to facilitate subsequent closing of the body by a heat sealing or fusing operation after the container is filled.

Numerous other objects and advantages of the invention will be apparent as it is better understood from the following description, which, taken in connection with the accompanying drawings, discloses a preferred embodiment thereof.

Referring to the drawings:

Fig. 4 is a view similar to Fig. 1, showing a modified form of the invention, with parts broken away; and Fig. 5 is a fragmentary sectional view showing certain of the parts in Fig. 4 in a different position.

As a preferred or exemplary embodiment of the instant invention the drawings disclose method steps and apparatus for treating by an electrical corona discharge, the interior surfaces of thermoplastic material containers A (Fig. 1) comprising a tubular thin walled body B provided at one end with a thermoplastic material head or end closure C formed with a dispensing nozzle D. The opposite end of the containers is open. The containers A preferably are made of polyethylene, although the invention is readily applicable to other thermoplastic materials such as polyamides, polyesters, vinyl polymers and copolymers, polymers of vinylidene chloride, polystyrene and polypropylene and its copolymers.

In the instant method of treating the interior surfaces of a container A, the container is first positioned, preferably, in an inverted position with its head end C lowermost, into an upright tubular metal holder 21 which completely surrounds the container in tight fitting relation against the outer surface of the container. The bottom of the holder preferably is formed to correspond to the contour of the container head C and to engage against the head.

Figure 1:
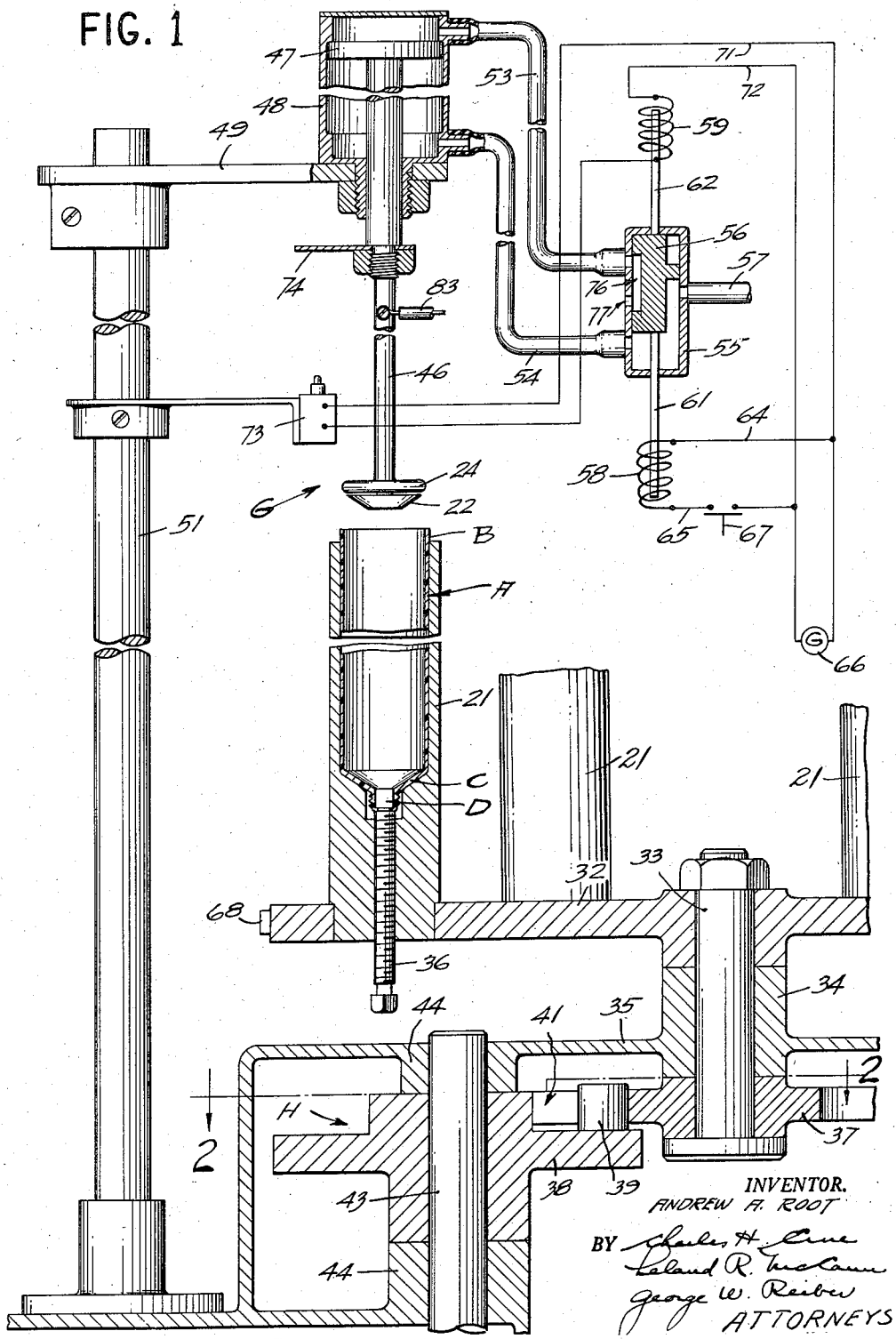
Figure 1 is a sectional view of an apparatus embodying the instant invention and utilized in carrying out the method steps of the invention, the view also showing a wiring diagram of electric devices used in the apparatus, parts of the apparatus being broken away.

The upper open end of the container body B preferably extends above the upper edge of the holder 21 as shown in Fig. 1 to prevent treatment of this portion of the body so that it can be readily sealed subsequently, after the container is filled. This holder 21 constitutes an outside electrode and is maintained at ground potential electrically.

With the container A disposed in the holder 21, an inner or insertable electrode 22 is provided and maintained at high voltage up to and in the region of 20,000 volts. This electrode 22 preferably is of disc shape with a diameter slightly less than the inside diameter of the container body. The outer peripheral edge of the electrode 22 is relatively thin so as to extend an incremental distance in the direction of its travel, which is along the axis of the container to be treated. The bottom face of the electrode preferably is shaped to correspond to the contour of the inner face of the container head or end closure C. Above the electrode a guide disc 24 of dielectric material of substantially the same diameter as the inside diameter of the container body, is provided.

While the container A is in the holder 21, the inner electrode 22 is inserted into the open end of the container body B and is progressively pushed toward the head end of the container, terminating this travel adjacent the container head C, and then reversing the travel and withdrawing the inner electrode from the container. This travel of the inner electrode 22 progressively encloses the walls of the container in an air gap, preferably of between .020" to .040" between the inner surface of the container and the inner electrode and simultaneously sets up between the inner and outer electrodes a corona discharge which treats the inner surfaces of the container, including the inner face of the head C, and tubular portion of orifice channel. Since the upper end of the container body B extends above the top end of the outer electrode or holder 21, no corona discharge is produced in this region as the inner electrode 22 moves into and out of the container. Hence this portion of the container is left untreated to facilitate subsequent sealing as mentioned above.

Where it is impractical to permit the open end of the container body to project up beyond the holder 21, the same results may be obtained by cutting off the supply of electric current from the inner electrode 22 while the electrode is passing this portion of the container.

In one form of apparatus for carrying out the method steps of the instant invention, a plurality of the container holders 21 are mounted in upright positions on a conveyor such as an endless chain or movable platform. The drawings preferably show a horizontally disposed turntable 32 (Fig. 1), carried on a vertical shaft 33 journaled in a bearing 34 of a machine frame 35. The table 32 is indexed intermittently to rotate each holder 21 in turn into a treating station G where a single inner electrode 22 is located to effect the treating operation while the table is at rest. Positioning of the containers into the holders 21 for treatment and removal therefrom after treatment may be effected in any suitable manner. An adjusting screw 36 in the bottom of each holder 21 is provided for engagement with the nozzle D on the container in the holder to locate the head C of the container relative to the shaped bottom of the holder, and control the portion extending beyond the holder.

Figure 2:
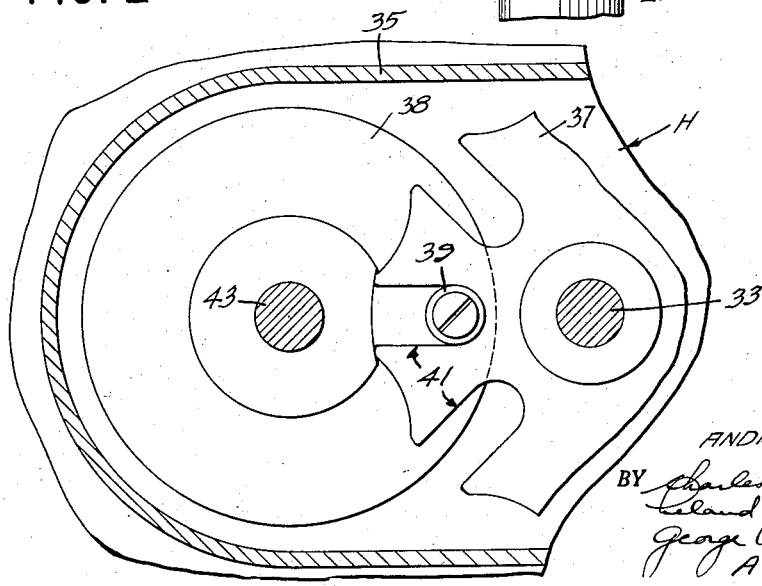
Fig. 2 is a top plan sectional view taken substantially along the broken line 2—2 in Fig. 1, with parts broken away.

Indexing of the table 32 preferably is effected through a conventional indexing device H (Figs. 1 and 2). Such a device may include a Geneva wheel 37 mounted on the table shaft 33 and rotated in a step-by-step fashion by a continuously operating Geneva crank 38 carrying a roller 39 which engages in radial slots 41 in the Geneva wheel 37. The crank 38 is mounted on a short shaft 43 journaled in bearings 44 in the machine frame. The shaft 43 may be rotated in any suitable manner.

At the treating station G, the reciprocation of the single inner electrode 22 and its guide disc 24, may be effected in any suitable manner. In the apparatus shown, they are carried on the lower end of a vertically disposed rod 46 (Fig. 1) aligned with the axis of a holder 21 at rest at the station. The upper end of the rod 46 carries a piston 47 which operates in a vertical cylinder 48 mounted on a bracket 49 attached to a vertical support 51 extending up from the machine frame 35.

The piston 47 is normally held at the upper end of the cylinder 48 to retain the inner electrode 22 in a retracted inoperative position and is reciprocated in the cylinder through a down stroke and a return stroke for each holder 21 as the latter is presented at the treating station for treatment of the container in the holder. This operation of the piston is effected by a fluid pressure medium preferably compressed air, introduced into the cylinder at its end portions. For this purpose the cylinder 48 adjacent its ends is connected by inlet pipes 53, 54 to a housing 55 of a slide valve 56 controlling the flow of compressed air from any suitable source of supply through a supply pipe 57.

Shifting of the slide valve 56 in its housing 55 preferably is affected by electric solenoids 58, 59 having respective movable cores 61, 62 attached to the ends of the slide valve 56. The solenoid 58 is connected by lead wires 64, 65 to a suitable source of electric current such as a generator 66. The wire includes a normally open electric switch 67 which is momentarily closed by lugs 68 protruding from the turntable 32 at each of the container holders 21.

The solenoid 59 is connected by lead wires 71, 72 to the generator 66 and to a normally open reversing switch 73 disposed adjacent the path of travel of the inner electrode 22. The reversing switch 73 is located for engagement, when the electrode is in its lowermost position in a container, by a finger 74 attached to the electrode rod 46.

In operation, the normal position of the slide valve 56 is in the position shown in Fig. 1 where the valve cuts off communication with the inlet pipe 53 so as to vent the upper end of the cylinder 48 through a vent channel 76 in the valve and a port 77 in the housing 55, and also provides for communication between the supply pipe 57 and the inlet pipe 54 to supply compressed air to the lower end of the cylinder and thereby hold the piston 47 in its up position.

When the indexing of the turntable 32 rotates a holder 21 and its container A into the treating station G, the switch actuating lug 68 adjacent this holder, snaps past the switch 67 and momentarily closes the switch just as the table stops rotating. Closing of the switch 67 momentarily energizes the solenoid 58 and this shifts the slide valve 56 from its normal position as shown in Fig. 1 to a position where it cuts off communication between the air supply pipe 57 and the inlet pipe 54 and thus vents the lower end of the cylinder 48 through the vent channel 76 in the slide valve and the port 77 in the housing 55. This shifting of the valve also opens communication between the air supply pipe 57 and the inlet pipe 53, thereby causing compressed air to enter the upper end of the cylinder 48 and push the piston down. This results in the lowering of the electrode 22 into the container A in the holder 21 for the treatment of the container as described above.

When the electrode 22 reaches the bottom of the container A in the holder 21, the actuating finger 74 on the electrode rod 46 engages against and temporarily closes the reversing switch 73. The closing of this switch energizes the solenoid 59 and thus shifts the slide valve 56 back into its normal position as shown in Fig. 1. This reverse movement of the slide valve cuts off communication between the supply pipe 57 and the inlet pipe 53 and opens communication between the supply pipe 57 and the lower inlet pipe 54, thereby venting the upper portion of the cylinder and admitting compressed air into the lower end of the cylinder to push the piston 47 up through its return stroke. This action withdraws the electrode 22 from the container A in its holder 21 and thereby terminates the treatment of the inner surface of the container.

Figure 3:
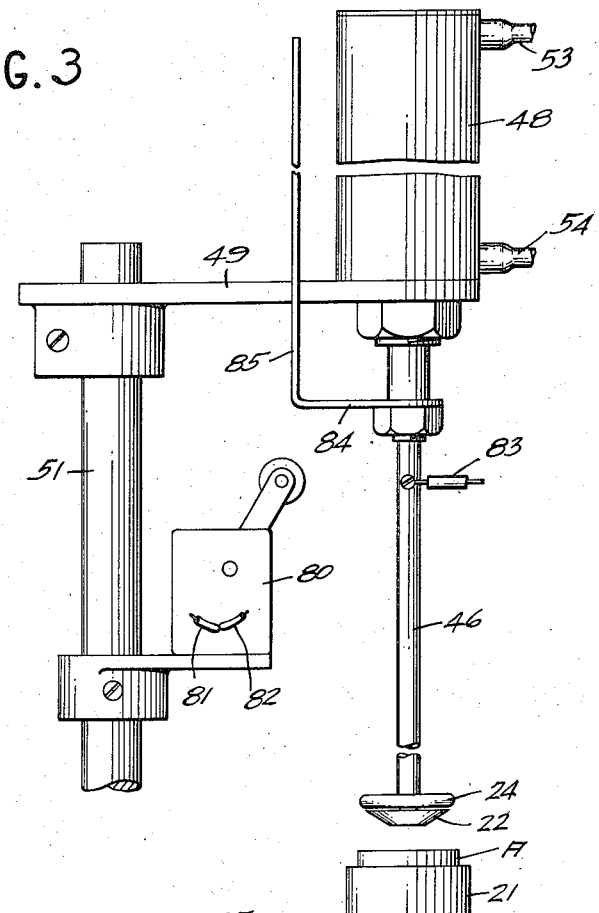
Fig. 3 is an elevational view of the upper portion of the apparatus shown in Fig. 1, with parts broken away; the view illustrating a slightly modified form of the apparatus.

In a modified form of the invention as shown in Fig. 3 provision is made for cutting off the electric current as the electrode 22 passes the upper marginal edge portion of the open end of the container, to leave this portion untreated to facilitate subsequent sealing of the end of the container as mentioned hereinbefore. In this modified form a normally open power switch 80 is connected by wires 81, 82 preferably into the primary side of a transformer supplying the high voltage electric current by way of a wire 83 to the inner electrode 22. This switch 80 is closed and reopened at the proper time by an arm 84 which moves with the electrode rod 46 and which is provided with an upright leg section 85 of a length to contact and hold the switch 80 closed for a predetermined cycle of operation of the electrode 22.

In operation, the upright leg section 85 of the actuating arm 84 engages and closes the power switch 80 when the electrode 22 is within the container A beyond (below) the upper marginal edge portion of the open end of the container. Thus the power is turned on and the corona discharge started below the portion of the container which is to be left untreated. As the electrode 22 continues through its down stroke, and its return stroke by reversal of the travel of the electrode through the reversing switch 73 and slide valve 56, the upright leg section 85 of the arm 84 rides along the switch 80 and thereby maintains it in a closed condition until on the return or up stroke of the electrode, the latter reaches the place where the corona discharge was started. At this point, the leg 85 rides off the power switch 80 and thus permits the switch to open and cut off the power. The corona discharge is thus dissipated and as the electrode on its up stroke withdraws from the treated container A, the upper marginal edge portion of the container is again passed by without treatment.

In a further modified form of the invention as illustrated in Figs. 4 and 5 the container A is supported in such a manner as to leave a major portion of its outer surface exposed to facilitate subsequent operations on the exterior surface of the container. In this form of the invention the holder 21 is short so as to merely support the container adjacent its head end C.

The inner electrode 22 and its guide disc 24 are mounted on the lower end of a hollow rod 87 which is carried in a vertically reciprocable head 88. In order to provide an effective electrical connection between the inner electrode 22 and the source of electric current, the electrode preferably is connected to the lower end of a sleeve 89 which is disposed inside the hollow rod 87 in spaced relation thereto and is connected thereto at its upper end. The sleeve 89 surrounds and is in frictional contact with a long connector rod 92 which extends up through the top of the hollow rod 87 and is attached to a stationary conductor bar 93 which is connected to the source of electric current. With such a construction the connector rod 92 remains stationary as the sleeve 89 rides up and down along the length of the rod with the vertical reciprocating movement of the head 88.

The inner electrode 22 is surrounded by an outer, vertically yieldable, ring electrode 95 having a vertical, straight wall section 96 of an inner diameter substantially equal to the outer diameter of the body B of the container A so as to firmly but not too tightly encompass the container body. This straight wall section 96 of the ring electrode merges into a depending section 97 having an outwardly flared or tapered inner wall to guide the ring electrode onto the container body B. An air gap of between .020" and .040" plus the thickness of the container body wall B is provided between the section 96 of the ring electrode 95 and the inner surrounded electrode 22.

The ring electrode 95 is mounted in a horizontal plate 98 which is yieldably connected to the head 88 by pilot pins 101. The lower ends of the pins are secured in the plate 98. The upper ends of the pins are slidably mounted in long bearings 102 in the head 88. Stop nuts 103 on the upper ends of the pins 101 above the bearings retain the plate in its proper position. Compression springs 104 interposed between the plate 98 and the bearings 102 provide for the yieldability of the plate and the outer ring electrode 95 carried thereon.

In operation, the head 88 is moved down toward a holder 21, indexed into position at the treating station G, and this lowers the inner electrode 22 and the outer ring electrode 95, in unison as a unit onto the upper open end of the container A in the holder. As this downward movement continues the inner electrode 22 enters and moves down into the container body with the guide disc 24 centralizing the electrode in the body, and the outer ring electrode 95 moves down along the outer surface of the body in close contact therewith. The container body wall is thus progressively enclosed in the air gap between the electrodes 22, 95 and is simultaneously treated on its inner surface by the corona discharge set up between the electrodes.

Near the lower end of the downward stroke of the electrodes 22, 95, the outer ring electrode 95 engages against and has its further downward travel arrested by the holder 21 as shown in Fig. 5. This is brought about by compression of the yieldable support springs 104 in the head 88 while the inner electrode 22 continues its down travel toward the head end C of the container. During this latter travel the holder 21 serves as the outer electrode to maintain the corona discharge effect against the surfaces of the container to be treated. In this form of the invention the upper edge of the holder 21 preferably is tapered to correspond with the tapered section 97 of the yieldable electrode 95 to provide for the continuity of the treatment of the inner surface of the container.

At the bottom of the stroke of the head 88, its travel is reversed as in the preferred form of the invention (Fig. 1), and on the up stroke, the outer ring electrode 95 resumes its original relation to the inner electrode 22 after the latter passes above the top of the holder 21 and the outer and inner electrodes thereafter travel up as a unit to their original starting or retracted positions. Movement of the head 88 may be effected in any suitable manner as through the mechanism discussed in connection with the preferred form of the invention or through other devices. In a similar manner the electric current for creating the corona discharge may be applied to the inner electrode continuously or may be cut off and re-established at certain places in the travel of the electrodes as explained hereinbefore.

It is thought that the invention and many of its attendant advantages will be understood from the foregoing description, and it will be apparent that various changes may be made in the form, construction, and arrangement of parts of the apparatus mentioned herein and in the steps and their order of accomplishment of the method described herein, without departing from the spirit and scope of the invention or sacrificing all of its material advantages, the apparatus and method hereinbefore described being merely a preferred embodiment thereof.

I claim:

1. A method of treating a surface of thermoplastic walls of open end tubular containers for the reception of a surface coating, comprising providing a container wall encompassing electrode and an inner electrode disposed in axial alignment with said encompassing electrode and formed to produce an air gap between said electrodes, shifting one of said electrodes axially relative to the other of said electrodes to enclose said container wall in said air gap between said electrodes, and passing a high voltage electric current between said electrodes to produce a corona discharge adjacent the surface of said container wall to be treated.

2. A method of treating a surface of thermoplastic walls of open end tubular containers for the reception of a surface coating, comprising positioning a container encompassing electrode adjacent the outer face of the container wall to be treated and positioning a container insertable electrode adjacent the inner face of said wall by relative axial movement between said electrodes, and producing an electrical corona discharge between said electrodes adjacent the container wall surface to be treated.

3. A method of treating a surface of thermoplastic walls of open end tubular containers for the reception of a surface coating, comprising enclosing a container in an encompassing electrode, providing a second electrode adapted to fit within said enclosed container, effecting relative axial movement between said electrodes to position said second electrode within said container, and forming an electrical corona discharge between said electrodes over the entire container wall surface to be treated.

4. A method of treating a surface of thermoplastic walls of open end tubular containers for the reception of a surface coating, comprising supporting a container in an encompassing electrode, progressively moving a second axially disposed electrode into and out of said container through its open end, and simultaneously during at least a portion of the movement of said second electrode relative to said container producing an electrical corona discharge between said electrodes to progressively treat said container wall surface to be treated.

5. A method of the character defined in claim 3 wherein the enclosing of said container is effected by supporting said container in a closely fitting holder of electrically conductive material constituting said encompassing electrode.

6. A method of the character defined in claim 3 wherein a predetermined marginal edge portion of an open end of said enclosed container is positioned beyond said encompassing electrode and is untreated through lack of said corona discharge to facilitate subsequent sealing of said marginal edge portion.

7. A method of the character defined in claim 3 wherein said encompassing electrode encloses an end member on said container and wherein said corona discharge treats a surface of said end member as well as the wall of said container.

8. A method of the character defined in claim 1 wherein said container fits tightly against one of said electrodes so as to produce an air gap adjacent the surface to be treated.

9. A method of the character defined in claim 1 wherein at least one of said electrodes is guided in substantially uniformly spaced relation to an adjacent surface of said container wall.

10. A method of the character defined in claim 1 wherein said high voltage current is cut off during a portion of the relative movement between said electrodes to leave a corresponding portion of said container wall untreated.

11. An apparatus for treating surfaces of the thermoplastic walls of open end tubular containers for the reception of a surface coating; comprising means holding the container with its axis in a predetermined line; an outer electrode means for encompassing a container held in said holding means disposed coaxially therewith; an inner electrode means coaxial with said holder means and outer electrode means and arranged to provide between itself and the latter a small air gap, at least one of said electrode means being of incremental dimension in the direction of said axis; mechanism for reciprocating at least one of said means axially with respect to the other means to bring said container, outer electrode means and inner electrode means into concentric relation with said container disposed in said air gap, to provide relative movement along the common axis between the incrementally dimensioned means and the other means to sweep said incrementally dimensioned means along the container wall, and to move certain of said means out of concentric relation for placement and removal of a container; and means for passing a high voltage current between said electrode means to produce a corona discharge in said air gap and treat a surface on a wall of said container.

12. An apparatus of the character defined in claim 11 wherein one of said electrode means and said holding means are formed as a single element.

13. An apparatus of the character defined in claim 11 wherein said outer electrode means is formed to fit tightly against the exterior wall of said container and wherein said inner electrode means is smaller than the inside diameter of the tubular container to produce an air gap adjacent the interior surface of the container to be treated.

14. An apparatus of the character defined in claim 11 wherein said outer electrode means and said holding means are formed as a single element which surrounds said container and wherein said inner electrode means is insertable into said container through its open end.

15. An apparatus of the character defined in claim 11 wherein one of said electrode means and said holding means are formed as a single element for holding the container and wherein said element is shorter than the length of said container to position a marginal edge portion adjacent an open end of said container beyond said element to effect non-treatment of said positioned marginal edge portion.

16. An apparatus of the character defined in claim 11 wherein correspondingly shaped end portions of said electrode means are provided to produce an air gap between them and to enclose in said air gap an end portion of said container to treat a surface of said container end portion simultaneously with the treatment of the side walls of said container.

17. An apparatus of the character defined in claim 11 wherein said outer electrode means is a sleeve for surrounding and supporting said container and wherein said inner electrode means is a disc disposed in axial alignment with said sleeve and in spacer relation thereto to provide an air gap between said electrode means, said disc being movable into and out of said sleeve to effect progressive treatment of a surface of a wall of said container.

18. An apparatus of the character defined in claim 17 wherein said disc electrode is provided with a guide member movable with said disc electrode and engageable against the inner surface of said container wall to maintain said air gap substantially uniform entirely around said disc electrode.

19. An apparatus of the character defined in claim 11 wherein one of said electrode means is disposed at a fixed station, and the other of said electrode means is mounted on a conveyor movable past said station, and wherein there is provided means for moving said conveyor and for stopping said conveyor with its electrode means in axial alignment with said fixed electrode means.

20. An apparatus for treating a surface of thermoplastic walls of open end tubular containers for the reception of a surface coating, comprising a holder for holding a container with its open end exposed, an electrode head disposed in axial alignment with and in spaced relation to said holder, an inner electrode secured to said head in axial alignment with said holder, an outer ring electrode surrounding said inner electrode in axial alignment therewith and in spaced relation thereto to provide an air gap between said electrodes, said outer electrode being yieldably mounted in an axial direction on said head, means for producing an electrical corona discharge in said air gap between said electrodes, and means for effecting relative axial movement between said head and said holder to enclose a wall of said container in said air gap between said inner electrode and said yieldable ring electrode and to provide for the arresting of the movement of said ring electrode against said holder and the continued movement of said inner electrode into said container for a distance equal to at least the length of said ring electrode to treat the enclosed wall of said container.

21. An apparatus of the character defined in claim 20 wherein there is provided guide means insertable into said container with said inner electrode for maintaining the wall of said container substantially uniformly spaced away from said inner electrode.

22. An apparatus of the character defined in claim 20 wherein said holder is of a height which exposes a major length of said container for subsequent operations and wherein said holder when engaged by said yieldable ring electrode provides an extension of said ring electrode for the continued treatment of the portion of the container surrounded by said holder.

23. An apparatus of the character defined in claim 20 wherein said inner electrode is attached to a hollow rod secured in said head and also attached to a sleeve mounted in said hollow rod and wherein there is provided a stationary connector rod disposed in said sleeve in frictional engagement therewith and connected to a source of electric current for conducting said current to said inner electrode without interfering with the vertical movement of said electrode with said head.

References Cited in the file of this patent

UNITED STATES PATENTS

| | | |
|---|---|---|
| 1,249,151 | McKee | Dec. 4, 1917 |
| 2,336,946 | Marden et al. | Dec. 14, 1943 |
| 2,390,596 | Larsen | Dec. 11, 1945 |
| 2,425,114 | Mulvany | Aug. 5, 1947 |
| 2,648,097 | Kritchever | Aug. 11, 1953 |

FOREIGN PATENTS

| | | |
|---|---|---|
| 510,068 | Belgium | Apr. 25, 1952 |